UNITED STATES PATENT OFFICE.

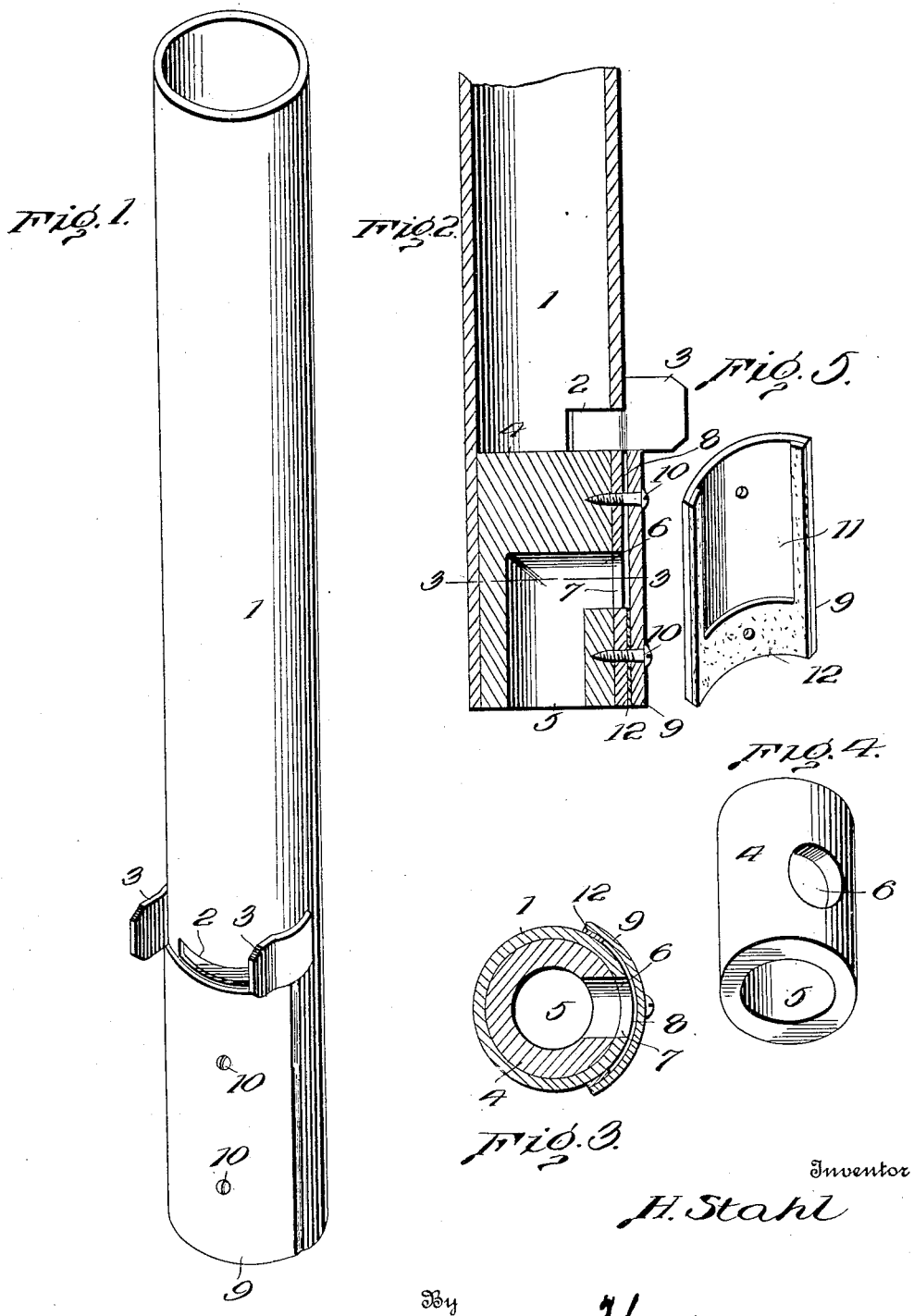

HERMAN STAHL, OF ERIE, PENNSYLVANIA.

ORGAN-PIPE.

1,174,098.

Specification of Letters Patent.

Patented Mar. 7, 1916.

Application filed June 22, 1915. Serial No. 35,589.

*To all whom it may concern:*

Be it known that I, HERMAN STAHL, a citizen of the United States, residing at Erie, in the county of Erie and State of Pennsylvania, have invented certain new and useful Improvements in Organ-Pipes, of which the following is a specification.

This invention relates to organ pipes, and has for its object the provision of a simple and inexpensive pipe which may be rapidly manufactured and be found efficient in use.

The invention consists in certain novel features which are illustrated in the accompanying drawings, hereinafter fully described, and then more specifically pointed out in the claims.

In the drawings:—Figure 1 is a perspective view of an organ pipe embodying my present invention; Fig. 2 is a vertical diametrical section of the same; Fig. 3 is a horizontal section taken on the line 3—3 of Fig. 2; Fig. 4 is a detail perspective view of the plug; and Fig. 5 is a detail perspective view of the cap.

In carrying out my invention, I employ a cylindrical pipe 1 which may be of any preferred or convenient material and is provided near its lower end with the usual slot 2 and outstanding projections 3 commonly called ears at the ends of said slot.

In the lower end of this tube I insert a wooden block or plug 4 which is of a diameter to fit snugly in the pipe so that, when driven therein, no gluing, soldering or similar fastening mediums will be needed. Within this block, I form an opening or passage 5 which is bored upwardly from the lower end thereof and meets a similar passage 6 which is bored diametrically through the block from the front side of the same, the said passage 6 registering with an opening 7 in the pipe 1, as clearly shown in Figs. 2 and 3.

The outer surface of the pipe, immediately above the opening 7, may be reduced if desired, so as to provide a sufficient passage 8 between the pipe and the cap 9 which is secured thereto over the opening 7, as shown. This cap may be secured to the pipe in any convenient or preferred manner, and in the accompanying drawings I have illustrated screws 10 inserted through the cap into the pipe and the block 4, but it is to be understood that this particular manner of fastening the cap is not essential and the cap may be secured in place in any other preferred manner. When the screws are employed, however, the upper screw may be utilized as an adjusting medium to vary the width of the space 8 and, consequently, determine the volume of air which may be permitted to pass into the body of the pipe. The cap extends to the lower wall of the slot 2, and on the inner side of the cap is a recess 11 which co-acts with the reduced surface of the pipe to form the said space, as will be readily understood. This recess 11 may be formed in any desired manner, but a very convenient method of providing the same is to secure to the inner face of a cap a substantially U-shaped plate 12 of some material which will form a tight joint between the pipe and the lower and side edges of the cap so as to prevent the leakage of air at those points and force it to travel upwardly.

In the use of the pipe, the air travels from the foot of the pipe through the bores 5 and 6 into the space between the cap and the pipe, and thence passes into the body of the pipe in the usual manner.

It will be readily seen that I have provided an exceedingly inexpensive device which may be manufactured and voiced very easily.

In the actual practice of my invention, I employ a portion of a cylindrical tube of some such material as vulcanized fiber in which the mouth may be quickly cut. Into the end of this tube, I drive a wooden plug in which holes have been bored, as described. For the cap, I employ a piece of the material cut from the same tube which was used to form the body of the pipe and apply the U-shaped strip 12 to the inner concave face thereof by means of glue or some other permanent adhesive so that, when the cap is in position, it will be held away from the pipe to provide the needed crevice or windway. The pipes embodying my invention may be either stopped or open and will produce a pure tone.

The invention obviously provides a labor-saving construction whereby the completed pipes may be very rapidly and cheaply manufactured. The fiber tubes may be quickly and easily cut into the proper lengths for the pipes and the wooden plugs may be rapidly turned and cut into the proper lengths in large quantities. The plugs are simply driven into the lower ends of the tubes and the caps may be made and applied very easily, cheaply and rapidly.

Having thus described the invention, what is claimed as new is:—

1. An organ pipe consisting of a cylindrical tube having a mouth near its lower end and provided with a lateral opening below the mouth, a plug driven in the lower end of the tube and having a bore opening through its lower end and registering with the lateral opening in the tube, a cap secured upon the tube over said lateral opening and extending to the mouth, and a spacing strip between the tube and the lower end and side edges of the cap to seal the joint between the cap and the tube and hold the cap in spaced relation to the tube between the said lateral opening and the mouth.

2. An organ pipe consisting of a cylindrical tube having a mouth near its lower end and provided with a lateral opening below the mouth, a plug driven in the lower end of the tube and having a bore opening through its lower end and registering with the lateral opening in the tube, and a cap consisting of a curved plate secured upon the tube and held in spaced relation thereto between the said lateral opening and the mouth.

3. An organ pipe consisting of a cylindrical tube having a mouth near its lower end and provided with a lateral opening below the mouth, a plug driven in the lower end of the tube and having a bore opening through its lower end and registering with the lateral opening in the tube, a cap fitted to the outer surface of the tube over said lateral opening and extending to the mouth and sealed along its lower end and side edges, and a fastening device inserted through the upper portion of the cap and into the tube whereby said upper portion of the cap may be adjusted toward and from the tube.

4. An organ pipe consisting of a cylindrical tube having a mouth near its lower end and provided with a lateral opening below the mouth, a plug driven in the lower end of the tube and having a bore opening through its open end and registering with the lateral opening in the tube, a cap consisting of a curved plate arranged against the outer surface of the tube at the lower end thereof, a U-shaped strip interposed between the lower end of the cap and the tube and between the side edges of the cap and the tube whereby to seal the joint between the cap and the tube and hold the cap in spaced relation to the tube above the lateral opening in the tube, and fastening devices inserted through the upper and lower portions of the cap into the tube.

In testimony whereof I affix my signature.

HERMAN STAHL. [L. s.]

Copies of this patent may be obtained for five cents each, by addressing the "Commissioner of Patents, Washington, D. C."